(12) United States Patent
Berg

(10) Patent No.: US 11,878,610 B2
(45) Date of Patent: Jan. 23, 2024

(54) CHILD SAFETY SEAT

(71) Applicant: Britax Römer Kindersicherheit GmbH, Leipheim (DE)

(72) Inventor: Florian Berg, Ulm (DE)

(73) Assignee: BRITAX RÖMER KINDERSICHERHEIT GMBH, Leipheim (DE)

(*) Notice: Subject to any disclaimer, the term of this patent is extended or adjusted under 35 U.S.C. 154(b) by 0 days.

(21) Appl. No.: 17/839,610

(22) Filed: Jun. 14, 2022

(65) Prior Publication Data

US 2022/0396183 A1 Dec. 15, 2022

(30) Foreign Application Priority Data

Jun. 15, 2021 (AU) ................................ 2021203980

(51) Int. Cl.
*B60N 2/28* (2006.01)
(52) U.S. Cl.
CPC ......... *B60N 2/2878* (2013.01); *B60N 2/2851* (2013.01)
(58) Field of Classification Search
CPC ............................ B60N 2/2878; B60N 2/2851
See application file for complete search history.

(56) References Cited

U.S. PATENT DOCUMENTS

| 9,771,005 | B2 | 9/2017 | Mo | |
|---|---|---|---|---|
| 10,507,743 | B2* | 12/2019 | Oswald | B60N 2/2851 |
| 2004/0189068 | A1* | 9/2004 | Meeker | B60N 2/2878 297/250.1 |
| 2005/0242642 | A1 | 11/2005 | Kespohl | |
| 2007/0188002 | A1 | 8/2007 | Jane Santamaria | |
| 2019/0176662 | A1 | 1/2019 | Pleiman et al. | |
| 2019/0184864 | A1* | 6/2019 | Denbo | B60N 2/818 |

FOREIGN PATENT DOCUMENTS

| AU | 2020220061 A1 | 3/2021 |
|---|---|---|
| EP | 1006017 B1 | 1/2005 |
| GB | 2296655 A | 7/1996 |

OTHER PUBLICATIONS

Australian Examination report No. 1 for standard patent application; Date of Report: Aug. 18, 2021, pp. 1-5 Australian Application No. 2021203980, Priority Date: Jun. 15, 2021—5 Pages.

* cited by examiner

*Primary Examiner* — Anthony D Barfield

(74) *Attorney, Agent, or Firm* — K&L Gates LLP

(57) ABSTRACT

A child safety seat comprising a seat shell comprising a seat portion and a back portion, an adjustable backrest configured to be moveable with respect to the seat shell between a first position, where at least a portion of the backrest is moved away from the back portion and closer to a front edge of the seat portion, reducing the available seating area for an occupant of the seat, and a second position, where at least a portion of the backrest is moved toward the back portion and further from the front edge of the seat portion, increasing the available seating area for the occupant of the seat.

4 Claims, 5 Drawing Sheets

CHILD SAFETY SEAT

CROSS REFERENCE TO RELATED APPLICATIONS

The instant application claims priority under 35 U.S.C. § 119 to Australian Patent Application No. 2021203980, entitled "Child Safety Seat" and filed Jun. 15, 2021, the disclosure of which is hereby incorporated by reference in its entirety.

TECHNICAL FIELD

The present invention relates to a child safety seat. In a particular form the present invention relates to a child safety seat with an adjustable backrest.

BACKGROUND

Child safety seats generally comprise a form-giving shell comprising a seat portion and a backrest portion, and may be secured with respect to the vehicle and have an independent 5 point harness which secures the child with respect to the safety seat or use the 3 point vehicle seat belt to secure the child with respect to the safety seat and vehicle.

Child seats may feature anti-submarining devices, in the form of a crotch strap and buckle (for harnessed seats) or a crotch strap with a lap belt engaging portion (for seats that use 3 point vehicle seat belts).

Child safety seats are generally configured to accommodate children across a range of sizes. Various aspects of a child safety seat may be reconfigurable to accommodate larger or smaller occupants, such as adjustable headrests, side wings, seat recline angles and adjustable harness straps.

One part of the child seat that may be adjusted for occupant size is the position of the crotch strap with respect to the backrest portion of the seat, such that the strap is able to be positioned closer to the backrest portion of the seat (to accommodate a smaller occupant) and further from the backrest portion of the seat (to accommodate a larger occupant).

A typical crotch strap has the buckle or belt engaging portion at one end and an attachment means at the other end (such as a bracket, three bar slide, or rod) for attachment to the shell of the safety seat. The strap is threaded through a slot in the shell and the attachment means retains the strap in the event of a crash or other sudden deceleration/acceleration event. The position of the crotch strap is dictated by the position of the slot in the shell, with some child seats often having two or more slots to adjust the position of the crotch strap.

In order to adjust the position of the crotch strap, a user is required to detach the attachment from the shell, and rethread the crotch strap through a different slot in the shell. This is a time consuming and fiddly process that can result in incorrect assembly of the crotch strap.

It is against this background that the present disclosure has been developed.

SUMMARY

According to a first aspect, there is provided a child safety seat comprising a seat shell comprising a seat portion and a back portion, an adjustable backrest comprising a first end which is slidably and pivotally secured with respect to the back portion, and a second end configured to bear against a supporting surface provided on the seat shell, wherein the backrest is configured to be moveable with respect to the seat shell between a lowermost position, where the second end of the backrest is moved away from the back portion and closer to a front edge of the seat portion, reducing the available seating area for an occupant of the seat, and an uppermost position, where the second end of the backrest is moved away from the front edge of the seat portion and closer to the back portion of the seat shell, increasing the available seating area for the occupant of the seat, wherein the backrest and supporting surface are configured such that the backrest is able to be moved up and down between the uppermost position and a defined position in between the uppermost position and the lowermost position, without a change in the available seating area, and wherein the backrest is able to be moved up and down between the defined position and the lowermost position with a change in the available seating area.

In one form, the second end of the backrest comprises at least one projection configured to bear against the supporting surface provide on the seat shell.

In one form, the seat shell comprises at least one recess configured to accommodate the at least one projection, the recess provided along a portion of the supporting surface, the recess extending from a first position corresponding to the uppermost position of the backrest to a second position corresponding to the defined position with relation to the back portion, the recess configured such that the backrest is able to move up and down between the uppermost position and the defined position without a change in the available seating area.

In one form, the child safety further comprises a headrest configured to be slidably secured with respect to the back portion of the seat shell, and moveable between an upper position and a lower position, and to which the backrest is pivotally connected, such that the backrest and headrest move together.

According to a further aspect, there is provided a child safety seat comprising a seat shell comprising a seat portion and a back portion, an adjustable backrest comprising an upper end which is slidably and pivotally secured with respect to the back portion, and a lower end configured to bear against a support surface provided on the seat shell, wherein the backrest is configured to be moveable with respect to the seat shell between a lowermost position, where the lower end of the backrest is moved away from the back portion and closer to a front edge of the seat portion, reducing the available seating area for an occupant of the seat and increasing an incline angle of the backrest with respect to the back portion, and an uppermost position, where the second end of the backrest is moved away from the front edge of the seat portion and closer to the back portion of the seat shell, increasing the available seating area for the occupant and decreasing the incline angle of the backrest with respect to the back portion, wherein the backrest is able to be moved up and down between the uppermost position and a defined position between the uppermost and lowermost positions, without a change in the incline angle of the backrest, and wherein the backrest is able to be moved up and down between the defined position and the lowermost position, with a change in the incline angle of the backrest.

BRIEF DESCRIPTION OF DRAWINGS

Embodiments of the present invention will be discussed with reference to the accompanying drawings wherein.

DETAILED DESCRIPTION

Figure 1:
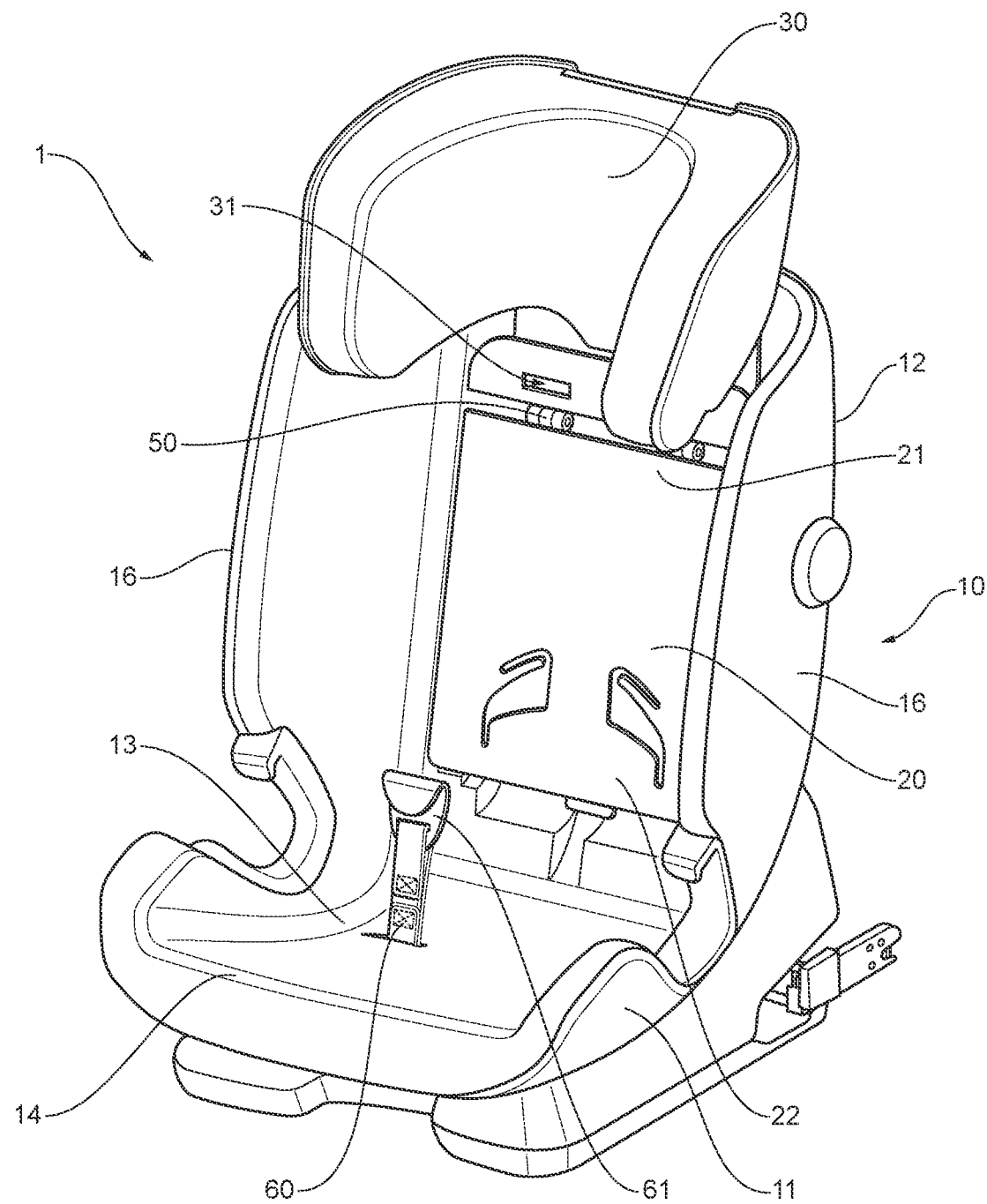
FIG. 1 is a perspective view of a child safety seat, according to an embodiment, with the backrest in an intermediate position.
Figure 2:
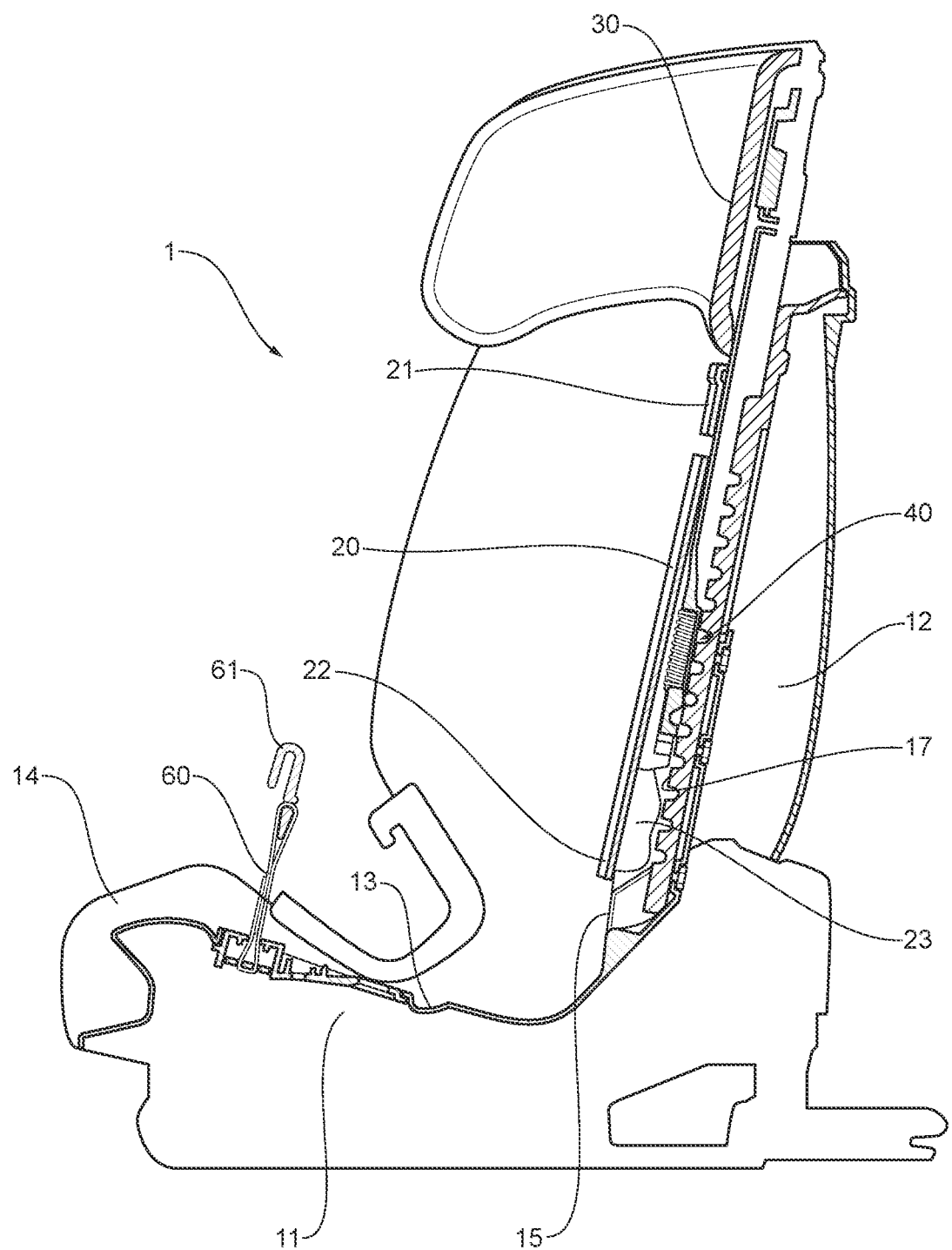
FIG. 2 is a cross-sectional view of the child safety seat of FIG. 1, with the backrest in an intermediate position.
Figure 3:
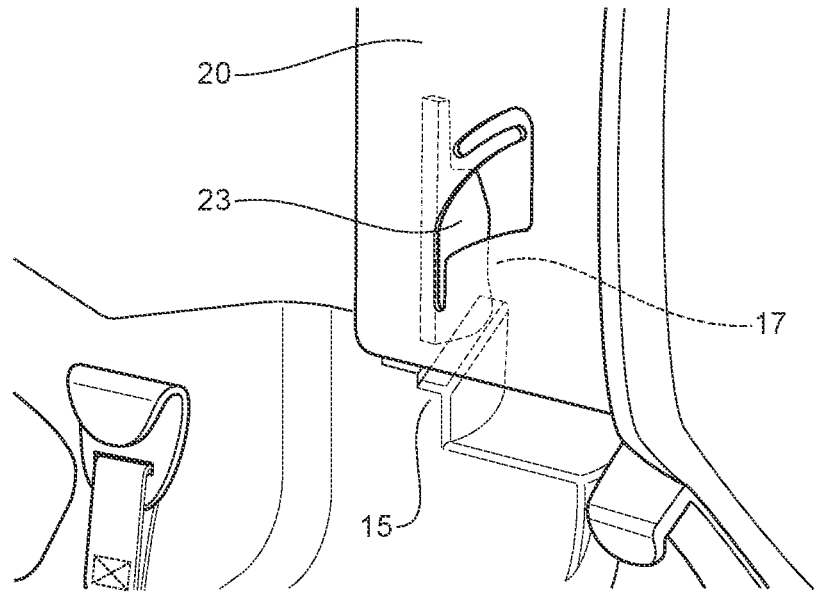
FIG. 3 is a perspective view of the child safety seat of FIG. 1, with the backrest in an intermediate position, detailing the relationship between the backrest and the seat shell.
Figure 4:
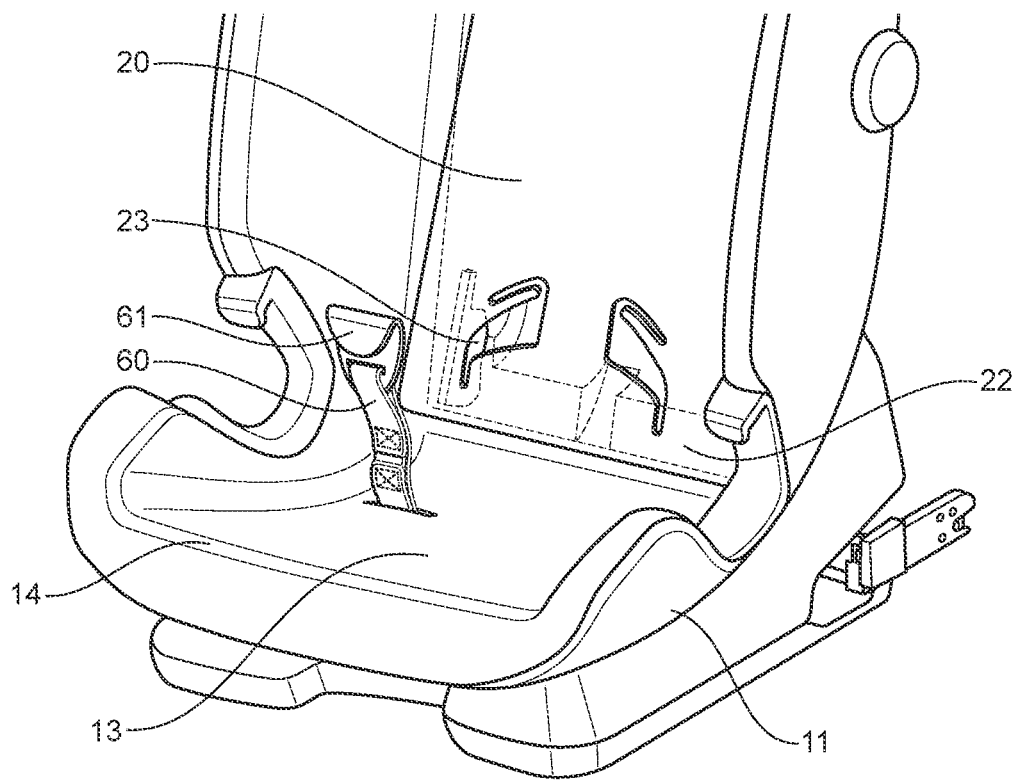
FIG. 4 is a perspective view of the child safety seat of FIG. 1, with the backrest in a lower position.
Figure 5:
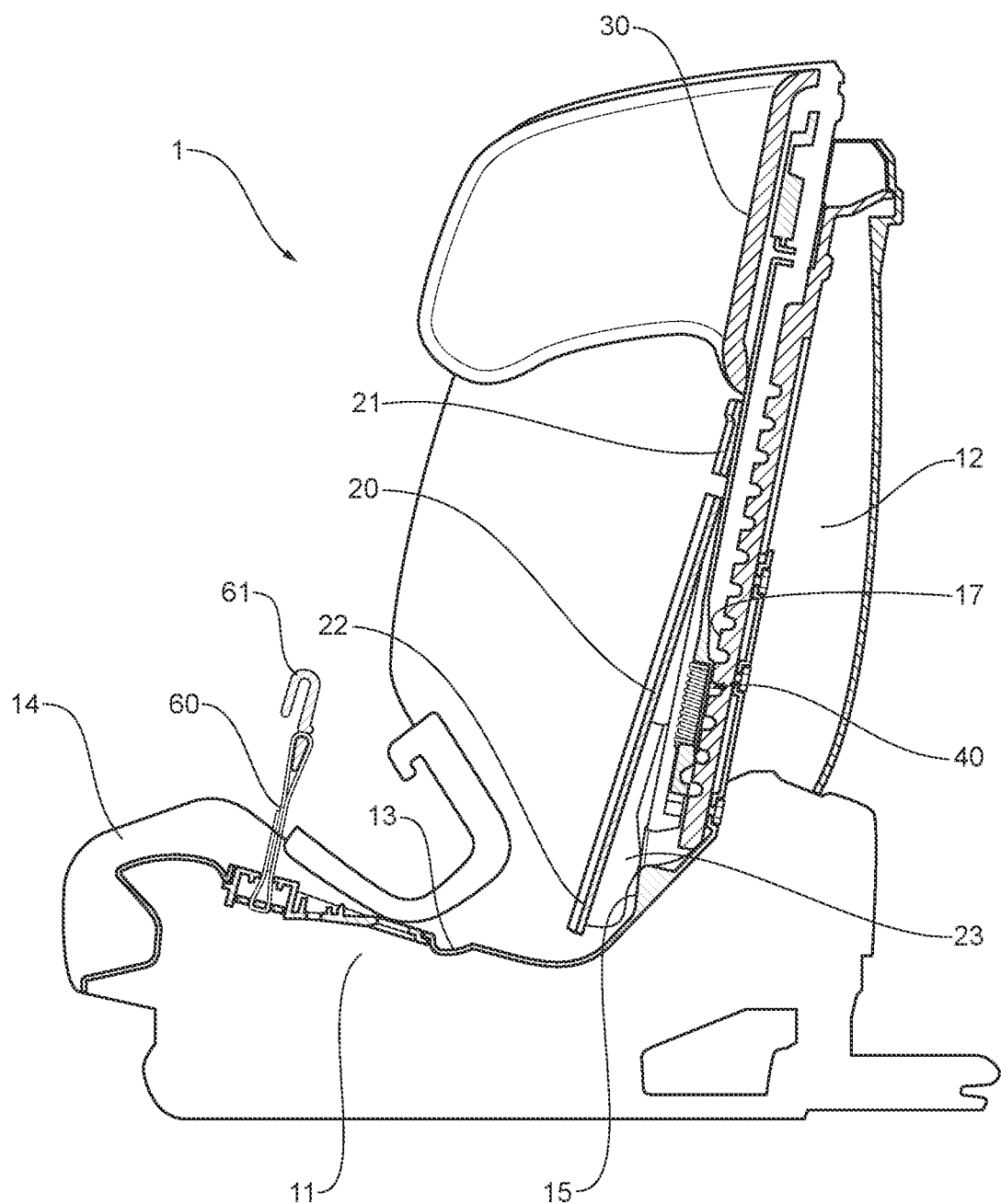
FIG. 5 is a cross-sectional view of the child safety seat of FIG. 1, with the backrest in a lower position.
Figure 6:
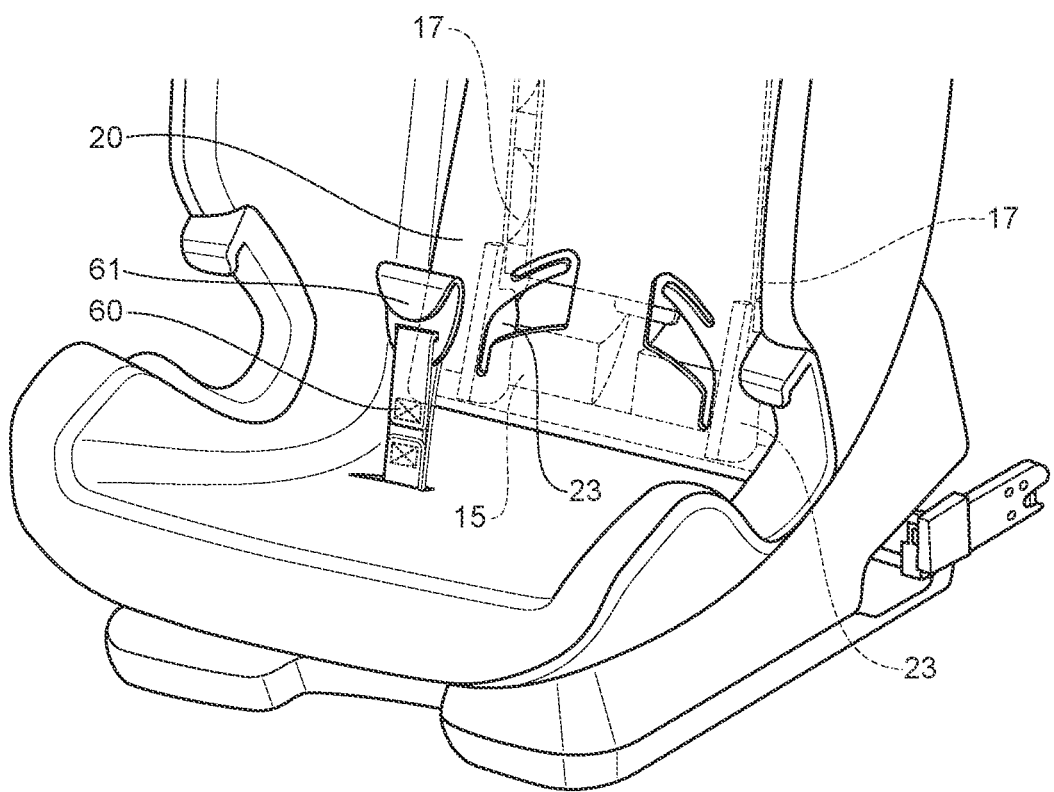
FIG. 6 is a perspective view of the child safety seat of FIG. 1, with the backrest in a lower position, detailing the relationship between the backrest and the seat shell.

Referring to FIGS. 1 to 6, there is shown a child safety seat 1 comprising a seat shell 10 comprising a seat portion 11 and a back portion 12. The seat portion 11 provides a seating area 13 for supporting the bottom and upper legs of an occupant of the seat. The back portion 12 provides a structure from which elements such as a backrest 20, side wings 16 and headrest 30 are supported and depend. The child safety seat 1 comprises an adjustable backrest 20 configured to be moveable with respect to the shell 10 between a lower position where at least a portion of the backrest 20 is moved away from the back portion 12 of the seat shell 10 and closer to a front edge 14 of the seat portion 11 of the seat shell 10, reducing the available seating area 13 for the occupant of the seat 1, and an upper position where at least a portion of the backrest 20 is moved toward the back portion 12 and further from the front edge 14 of the seat portion 11, increasing the available seating area 13 for the occupant of the seat 1.

For illustrative purposes, the child safety seat 1 is shown with a crotch strap 60 and lap belt engaging portion 61, however it will be appreciated that in an alternate embodiment, the child seat may feature a crotch strap and harness buckle. It will be appreciated that in a further embodiment, that the child safety seat may be capable of being used in a harnessed configuration, requiring a crotch strap and buckle, and a booster seat configuration, requiring a crotch strap and lap belt engaging portion.

The child safety seat 1 also comprises a headrest 30 (as best seen in FIG. 1) slidably secured with respect to the back portion 12 of the seat shell 10, and moveable between an upper position and a lower position. The position of the headrest 30 is able to be incrementally adjusted between the upper and lower positions by virtue of an adjustment assembly 40, as is known in the art.

In addition to adjustably positioning internal padding and external protection elements with respect to the head of the occupant of the seat 1, the adjustable headrest 30 may also carry harness slots 31, which adjustably position a seat harness (not shown) with respect to the shoulders of the occupant of the seat 1.

It can be seen that the first, upper end 21 of the backrest 20 is pivotally secured with respect to the headrest 30 via a hinge arrangement 50. It will be appreciated that this arrangement 50 allows the headrest 30 and backrest 20 to move in unison, between an upper position, in order to accommodate a larger occupant, and a lower position, in order to accommodate a smaller occupant.

The second, lower end 22 of the backrest 20 is configured to follow/bear against a support surface 15 provided by the seat shell 10. The supporting surface 15 and backrest 20 are configured such that when the backrest 20 is in the lower position, the lower end 22 of the backrest 20 is moved away from the back portion 12 and closer to a front edge 14 of the seat portion 11, reducing the available seating area 13 for an occupant of the seat 1 and consequently reducing the distance between the backrest 20 and the crotch strap 60. Conversely, when the backrest 20 is in the upper position, the second end 22 of the backrest 20 is moved away from the front edge 14 of the seat portion 11 and closer to the back portion 12 of the seat shell 10, increasing the available seating area 13 for the occupant, and consequently increasing the distance between the backrest 20 and the crotch strap 60.

By virtue of the pivotal connection between the backrest 20 and headrest 30, the incline of the backrest 20 (angle between the seat portion 11 and backrest 20) is also adjusted, where the backrest 20 provides an upright seating position for larger occupants when the backrest 20 is in the upper position, and a reclined seating position for smaller occupants when the backrest 20 is in the lower position.

It will be appreciated that by connecting the movement of the headrest 30 and backrest 20 together that a single adjustment assembly 40 can be used to adjust the position of the headrest 30 and backrest 20 relative to the seat shell 10, and that the position of the headrest 30, harness (not shown), available seating area 13 and backrest recline angle are all able to be simultaneously adjusted.

While in the embodiment shown, the backrest 20 is pivotally secured with respect to the headrest 30 by way of a hinge arrangement 50, connecting the two separate components, it will be appreciated that any arrangement that allows the pivotal or rotational movement of the backrest with respect to the headrest is intended to fall within the scope of this disclosure. For instance, in an alternate embodiment, the backrest 20 and at least a portion of the headrest 30 may be formed from a unitary body which comprises a thinned or weakened section (also known as a living hinge) which allows the backrest to pivot with respect to the headrest 30.

It can be seen that the backrest 20 features at least one projection 23, configured to follow/bear against the supporting surface 15 provided by the seat shell 10. It will be appreciated that the size and shape of the projection 23 dictates the extent to which the backrest 20 extends from the back portion 12. It can also be seen that a recess 17 is provided for the at least one projection 23 along a portion of the supporting surface 15 in which the projection 23 is accommodated when the headrest 30 and backrest 20 are in upper positions, such that the backrest 20 is able to move up and down along with the headrest 30 without a change in the incline angle or available seating area. This recess 17 terminates at a defined position in relation to the height of the headrest 30 and backrest 20, such that as the headrest 30 and backrest 20 are lowered further, the at least one projection 23 is driven out of the recess 17 and away from the back portion 12 of the seat shell 10 such that the backrest 20 then undergoes a change in incline angle and reduces the available seating area 13.

While in the embodiment shown, the supporting surface is provided by the seat shell, it will be appreciated that in an alternate embodiment, the supporting surface may be provided by an intermediate structure.

While in the embodiment shown, the backrest is driven away from and toward the back portion of the seat shell by virtue of the projection being driven up and down supporting surface, it will be appreciated that other means for achieving this outcome are intended to fall within the scope of this disclosure.

While in the embodiment shown, the backrest is adjustable by virtue of movement of the headrest, it will be appreciated that alternative means for adjusting the backrest will also fall within the scope of this disclosure.

In one example, the child safety seat may also comprise height adjustable side wings (not shown) where instead of, or as well as the backrest being pivotally secured with respect to the headrest, the backrest is pivotally secured with respect to the side wings, such that as the side wings are moved up and down, the backrest also moves up and down in a similar fashion to that previously described.

In a further example, the backrest may be configured to move responsive to movement of the headrest, without being pivotally connected. For example, the backrest may be pivotally connected with respect to the seat shell, and the lower end of the backrest may be connected with the headrest by virtue of a push-pull cable or similar (not shown) where upward and downward movement of the headrest causes an inward and outward movement of the lower end of the backrest with respect to the back portion of the seat shell respectively.

In yet a further example, the backrest may be configured to move responsive to actuation of a separate adjustment mechanism, such that the position of the backrest is not automatically adjusted along with other features.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

What is claimed is:

1. A child safety seat comprising:
   a seat shell comprising a seat portion and a back portion; and
   an adjustable backrest comprising a first end which is slidably and pivotally secured with respect to the back portion, and a second end configured to bear against a supporting surface provided on the seat shell, wherein the backrest is configured to be moveable with respect to the seat shell between a lowermost position, where the second end of the backrest is moved away from the back portion and closer to a front edge of the seat portion, reducing the available seating area for an occupant of the seat, and an uppermost position, where the second end of the backrest is moved away from the front edge of the seat portion and closer to the back portion of the seat shell, increasing the available seating area for the occupant of the seat,
   wherein the backrest and supporting surface are configured such that the backrest is able to be moved up and down between the uppermost position and a defined position in between the uppermost position and the lowermost position, without a change in the available seating area, and wherein the backrest is able to be moved up and down between the defined position and the lowermost position with a change in the available seating area
   wherein the second end of the backrest comprises at least one projection configured to bear against the supporting surface provided on the seat shell.

2. The child safety seat as claimed in claim 1, wherein the seat shell comprises at least one recess configured to accommodate the at least one projection, the recess provided along a portion of the supporting surface, the recess extending from a first position corresponding to the uppermost position of the backrest to a second position corresponding to the defined position with relation to the back portion, the recess configured such that the backrest is able to move up and down between the uppermost position and the defined position without a change in the available seating area.

3. The child safety seat as claimed in claim 1, further comprising a headrest configured to be slidably secured with respect to the back portion of the seat shell, and moveable between an upper position and a lower position, and to which the backrest is pivotally connected, such that the backrest and headrest move together.

4. A child safety seat comprising:
   a seat shell comprising a seat portion and a back portion; and
   an adjustable backrest comprising an upper end which is slidably and pivotally secured with respect to the back portion, and a lower end configured to bear against a support surface provided on the seat shell, wherein the backrest is configured to be moveable with respect to the seat shell between a lowermost position, where the lower end of the backrest is moved away from the back portion and closer to a front edge of the seat portion, reducing the available seating area for an occupant of the seat and increasing an incline angle of the backrest with respect to the back portion, and an uppermost position, where the second end of the backrest is moved away from the front edge of the seat portion and closer to the back portion of the seat shell, increasing the available seating area for the occupant and decreasing the incline angle of the backrest with respect to the back portion,
   wherein the backrest is able to be moved up and down between the uppermost position and a defined position between the uppermost and lowermost positions, without a change in the incline angle of the backrest, and wherein the backrest is able to be moved up and down between the defined position and the lowermost position, with a change in the incline angle of the backrest wherein the lower end of the backrest comprises at least one projection configured to bear against the supporting surface provided on the seat shell.

* * * * *